United States Patent Office 2,722,484
Patented Nov. 1, 1955

2,722,484

METHODS FOR HARDENING PROTEINS AND HARDENING SOLUTION

Isadore Kowarsky, University City, Mo.

No Drawing. Application April 10, 1950,
Serial No. 155,120

5 Claims. (Cl. 106—135)

This invention relates in general to methods for inhibiting the chemical reaction between oxidizing and reducing compounds and, more particularly, between reducing agents, and compounds containing a polyvalent component capable, upon reduction, of producing ions which in turn can be caused to react with various compounds, such as proteins, gum arabic, soaps and the like.

It is one of the primary objects of the present invention to provide a method for inhibiting the chemical reaction between reducing agents and oxidizing agents of the type stated for any predetermined or desired length of time.

It is a further object of the present invention to provide a solution or dispersion of a material which can be insolubilized, precipitated, hardened, or tanned, containing the insolubilizing hardening or tanning agent in inhibited form, but which can be rendered active when desired.

It is another object of the present invention to provide a protein solution in which the protein is maintained in solubilized form for any desired length of time and can be employed as an adhesive, as a vehicle for paints and other coating materials, as a vehicle for water-dispersed printing inks, as a water-dispersed coating for paper and textiles, as a waterproof glue for wood and paper, as a vehicle in leather polishes, as a paper impregnant, or as a vehicle for protein type plastics, and in such form will, when desired, become irreversibly hardened to provide a substantially water resistant coating or material.

With the above and other objects in view, my invention resides in the novel processes and compositions of matter presently described and pointed out in the claims.

Broadly speaking the present invention resides in the discovery that the reaction between a reducing agent and certain oxidizing compounds containing a polyvalent metallic ion can be inhibited while in solution for any length of time that may be desired, by maintaining the pH of the solution above a certain threshold of alkalinity which rises as the temperature is increased. It has also been discovered that this inhibition of the reaction can be removed so as to release the metallic ion in a form or state in which it will, for instance, react with a solubilized protein in the manner of a tanning agent. Protein materials, such as animal glue, casein, zein, soy bean protein, and animal hides, for example, can thus be tanned or converted to form a relatively insoluble water resistant compound. Similarly gum arabic, shellac, soaps, and many other non-proteinaceous materials can be hardened or precipitated by such metallic ions and hence the present invention can be applied to the hardening or precipitation of such materials on a time-delayed or controlled basis.

For example, when a solution of a chromate and a solution of a sulfite are mixed, a reaction ordinarily would take place at once to form a sulfate and a trivalent chromium salt, which becomes a source of trivalent chromium ions. However, it has been discovered that if the pH of both solutions are adjusted to approximately 8.5, the solutions can be mixed at normal room temperature and no reaction will take place for as long as the pH is maintained at, or in excess of 8.5. However, if the pH is brought below 8.0, the chromate and sulfite will react as above indicated.

If a volatile alkalizing agent, such as ammonia, or an organic amine, such as ethylamine, or pyridine is used, it is possible to maintain a pH of 8.5 or greater as long as the alkalizing agent is held in the solution. When the alkalizing agent is permitted to evaporate by exposure of the solution to atmosphere at room temperature, or is driven off by artificial heat, or if the temperature of the solution is raised so that the threshold of alkalinity or, in other words, the minimum inhibiting pH, is raised above the actually existent pH of the solution, the reaction between the chromate and sulfite will take place, and if this solution happens to be in the presence of a protein or any other of the materials mentioned, a further reaction will take place between that material and the trivalent chromium ion formed by the reduction of the chromate, to form an insoluble water resistant compound.

By way of example, but not for purposes of limitation, protein adhesives, such as casein, for instance, can be solubilized in a hot solution containing sodium or ammonium sulfite to the extent of 15% by weight of the protein. This solution is cooled to room temperature, and is then alkalized to a pH of 8.5 or above by the addition of ammonia water. Next, a solution is made containing ammonium or potassium dichromate in an amount chemically equivalent to the amount of sodium or ammonium sulfite, and ammonia water is added to bring this solution up to a pH of 8.5 or above. The alkalized dichromate solution can then be mixed with the alkalized protein solution without any resulting reaction, and as long as the pH is maintained at approximately 8.5 or above, the reaction will continue to be inhibited. The solution thus resulting can be used as a vehicle for paint, paper coating compositions or for any purpose to which a protein solution can be applied. Such a composition can be worked in any usual manner, and when it becomes desirable to permit the protein to harden, the composition can be exposed to atmosphere at room temperature to permit the ammonia to evaporate, or the material can be heated to drive off the ammonia even more rapidly, or the temperature can be raised rapidly to shift the threshold alkalinity irrespective of the loss of ammonia. In any such case the composition will harden to form a relatively insoluble water resistant coating or compound.

In this connection it should be noted that the quantities of the materials to be used are not critical. The important factor involved in the process is that while the protein solution is maintained in solubilized form, the pH thereof should be maintained at 8.5 or above. Actually in the range of room temperatures, the threshold of alkalinity has been found to be approximately a pH of 8.0. Below such level of alkalinity, and at room temperature, the reaction proceeds rapidly. For practical commercial purposes, it is preferable to maintain the solution substantially at or above a pH of 8.5 so long as it is desired to retain the protein in solubilized form, to afford a "safety factor" so to speak, and by the same token when it is desired to permit the protein to harden it is then desirable to bring the alkalinity down to a pH of 8.0 or below. It should also be apparent that the reaction can be rapid or slow, as may be desired, depending upon the speed with which the ammonia is permitted to evaporate. For some purposes it may be desirable to have the hardening action work rather slowly, and in such instances it is merely necessary to arrange for a relatively slow or retarded evaporation of the ammonia, or to use an organic alkalizing agent having a higher boiling point.

As it has been above pointed out, the present method can be employed using other alkalizing agents than ammonia or ammonia water. Any organic alkalizing agent, such as ethylamine, or pyridine, may be used. The chief requirements are that the material should be volatile at the selected working temperatures, that it be water soluble, and that it should be capable of producing the required pH. Furthermore, the reducing agent may be varied since the invention is by no means limited to the use of sodium or ammonium sulfite, although these latter agents are preferable because they serve the dual function of solubilizing the protein and acting as reducing agents, and in addition, they have a desirable threshold of alkalinity range at normal working temperatures. Examples, of other effective reducing agents under different conditions of pH and temperature are, citrates, tartrates, thiosulfates, oxalates, reducing sugars, and the like.

Material which may be used in the present process for insolubilizing the protein or precipitating the dipersed materials above referred to, may be a compound of any of the heavy metals which are active oxidizing agents in their higher-valence states, when in solutions of proper alkalinity, and which, when in such state do not react with the dispersed material, but which, when reduced to a lesser valence, will produce ions capable of reacting with the dispersed material to form a water insoluble or water resistant end product. Examples of such metals are, tungsten, vanadium, chromium, and molybdenum, although in actual practice the most commonly available and satisfactory materials are chromium salts.

The present invention has useful application in a rather wide range of different technological fields. For example, plywood can be bonded using a protein adhesive formulated in accordance with the present invention, and it has been found that plywood thus bonded has a water resistant property approximating plywoods, which are bonded with expensive thermosetting resins.

Similarly, the present invention may be applied to the manufacture of water-dispersed paint, water-dispersed printing ink, water-dispersed coatings for papers and textiles, leather polishes, paper impregnants, synthetic protein fibers, and various types of finishes of wood, metal, and fabric.

The present invention can be applied to the tanning of leather by preparing an inhibited solution of a tanning agent and soaking the animal hides until they are thoroughly impregnated, in such solution. Thereupon the alkalizing agent can be driven off, or the temperature raised so as to remove inhibition and allow the tanning reaction to proceed.

It should be understood that changes in the methods, compositions, and combinations above set forth may be made without departing from the nature and principle of my invention.

Having thus described my invention, what I claim and desire to secure by Letters Patent is:

1. A reagent for hardening solubilized proteins, which reagent consists of an aqueous solution of a sulfite, a chromium compound containing a reducible chromium ion, and ammonium hydroxide, said solution having a pH of approximately 8.5.

2. A reagent for hardening solubilized proteins, which reagent consists of an aqueous solution of ammonium sulfite, ammonium dichromate, and ammonium hydroxide, said solution having a pH of approximately 8.5.

3. A reagent for hardening solubilized proteins, which reagent consists of an aqueous solution of sodium sulfite, ammonium dichromate, and ammonium hydroxide, said solution having a pH of approximately 8.5.

4. The method of forming a hardened protein from an aqueous solution of solubilized protein which comprises forming an aqueous solution containing the solubilized protein, a sulfite, a volatile alkali, and an oxidizing agent selected from the class of inorganic salts of chromium wherein the chromium is in the hexavalent state and is capable of being reduced to the trivalent state, adjusting the alkalinity of such solution to a pH in excess of 8.5, and evaporating the volatile alkali from such solution when it is desired to produce a hardened protein.

5. The method of forming a hardened protein which comprises forming an aqueous solution of a sulfite, forming a separate aqueous solution of an oxidizing agent selected from the class of inorganic chromates in which the chromate is hexavalent and is capable of being reduced to the trivalent state, adjusting the alkalinity of both solutions by the addition thereto of ammonium hydroxide so that said solutions have substantially the same pH and so that such pH is in excess of 8.5, mixing said solutions and maintaining the alkalinity of said combined solutions at a pH in excess of 8.5, and subsequently evaporating ammonia from such solution to remove same and reduce the alkalinity substantially below a pH of 8.5 whereupon the reaction will proceed.

References Cited in the file of this patent

UNITED STATES PATENTS

| | | |
|---|---|---|
| 1,373,412 | Craver | Apr. 5, 1921 |
| 2,101,574 | Dangelmajer | Dec. 7, 1937 |
| 2,210,481 | Brother et al. | Aug. 6, 1940 |
| 2,217,850 | Warne | Oct. 15, 1940 |
| 2,228,158 | Teale | Jan. 7, 1941 |
| 2,298,269 | Atwood | Oct. 13, 1942 |
| 2,350,953 | Bain et al. | June 6, 1944 |
| 2,380,020 | Brother | July 10, 1945 |
| 2,570,561 | Kinney | Oct. 9, 1951 |

FOREIGN PATENTS

| | | |
|---|---|---|
| 118,155 | Australia | Mar. 2, 1944 |

OTHER REFERENCES

"Hydrogen Ions," Britton, pgs. 371–373, 381, D. Van Nostrand Co. Inc., N. Y. C. 1929.

"The Chrome Tanning Process," Merry, a Harvey Publisher, London, England, 1936, pages 16 and 31.

Sutermeister et al: "Casein and Its Industrial Applications," second ed., ACS Monograph Series No. 30, Reinhold Pub. Co., New York, 1939, pages 196–7.

Kolthoff and Stenger: "Volumetric Analysis" vol. I, pages 5, 6, 161 to 179; vol. II, pages 44, 127, 316, 317 (1947) Interscience Pub., Inc., New York City.

Feigl: "Chemistry of Specific, Selective, and Sensitive Reactions" pages 80, 116, 689, 690 (1949) Academic Press, Inc., New York city.